US005288314A

United States Patent [19]
Howard et al.

[11] Patent Number: 5,288,314
[45] Date of Patent: Feb. 22, 1994

[54] POLISH

[75] Inventors: Scott Howard, Hartsdale; Richard Frazer, Jr., Williamsville, both of N.Y.

[73] Assignee: Crescent Manufacturing, Eden, N.Y.

[21] Appl. No.: 925,392

[22] Filed: Aug. 4, 1992

[51] Int. Cl.$^5$ ............................................. C09G 1/04
[52] U.S. Cl. .......................................... 106/3; 106/11
[58] Field of Search ...................................... 106/3, 11

[56] References Cited

U.S. PATENT DOCUMENTS

| | | | |
|---|---|---|---|
| 3,847,622 | 11/1974 | Brandl et al. | 106/10 |
| 4,013,475 | 3/1977 | Liebowitz et al. | 106/10 |
| 4,398,953 | 8/1983 | van der Linde | 106/10 |
| 4,497,919 | 2/1985 | Varga et al. | 252/8.57 |
| 4,732,612 | 3/1988 | Steer et al. | 106/11 |
| 4,950,467 | 8/1990 | Phalangas et al. | 106/3 |
| 5,141,555 | 8/1992 | Elepano | 106/3 |

*Primary Examiner*—Helene Klemanski
*Attorney, Agent, or Firm*—Ohlandt, Greeley & Ruggiero

[57] ABSTRACT

A polish is provided for cleaning metallic and fiberglass surfaces, such as an automobile, truck and boat bodies, and for providing a protective film on the surface. The polish comprises water in an amount between about 40.0 to about 75.0 percent, a solvent in an amount between about 12.0 to about 35.0 percent, a rheological additive in an amount between about 0.30 to about 1.0 percent, an ultraviolet absorber in an amount between about 0.05 to about 0.50 percent, a dye in an amount between about 0.0005 to about 3.0 percent, a first silicate in an amount between about 5.0 to about 15.0 percent, dimethylpolysiloxane in an amount between about 0.50 to about 6.0 percent, a silicone resin solution in an amount between about 0.10 to about 3.0 percent, oleic diethanol amide in an amount between about 0.50 to about 2.0 percent, a second silicate in an amount between about 0.10 to about 3.0 percent, and a bactericide in an amount between about 0.05 to about 0.20 percent, by weight of the total polish.

16 Claims, No Drawings

POLISH

BACKGROUND OF THE INVENTION

The present invention relates generally to a polish and a method for formulating same and, more particularly, to a polish that is used to enhance the original color of the treated surface and provide longlasting high gloss polymer protection.

Polishes have been employed to clean dirt, dust and grime from a surface, such as an automobile, truck, boat and other metal and fiberglass surfaces. These polishes have not, however, been known to enhance the original or true color of the automobile's body. These polishes have merely added dye to an ordinary wax. Accordingly, as the wax wears off the treated surface so does the dye.

In recent years, there has been an increased concern over the damage done to surfaces that are exposed to the sun and ultraviolet rays. Compositions have been known to include ultraviolet ray resistant ingredients in their products, such as sunscreen lotions. Heretofore, few, if any, polishes have included sun and ultraviolet ray resistant properties. Furthermore, such polishes have not provided the adhesion to the surface and the enhancement of the surface's color as provided for by the present polish. Moreover, such polishes have not provided the high gloss polymer protective layer or film coat of the present polish.

SUMMARY OF THE INVENTION

Against the foregoing background, it is a primary object of the present invention to provide a polish for removing dirt, dust and grime from metallic and fiberglass surfaces.

It is another object of the present invention to provide such a polish that removes oxidation and restores original luster to dull or faded surfaces by the ability of the polish to blend with the color of the surface.

It is a further object of the present invention to provide such a polish that blends together with a wide range of different shades of colored surfaces.

It is a still further object of the present invention to provide such a polish that provides a unique blend of color absorbant and color reflective particles that improve the adherence of the polish to the surface and the ability of the polish to blend with a range of color shaded surfaces.

It is still yet a further object of the present invention to provide such a polish that provides a high gloss polymer protective layer on the polished or treated surface.

It is yet another object of the present invention to provide such a polish that is formulated in a three stage process in order to preserve the integrity of the formed polish.

To the accomplishments of the foregoing objects and advantages, the present invention, in brief summary, includes a polish for treating a surface and providing a high gloss polymer protective layer thereon. The polish comprises: water in an amount between about 40.0 to about 75.0 percent, a solvent, preferably petroleum naphtha, in an amount between about 12.0 to about 35.0 percent, a rheological additive in an amount between about 0.30 to about 1.0 percent, an ultraviolet absorber in an amount between about 0.05 to about 0.50 percent, dye in an amount between about 0.0005 to about 3.0 percent, a first silicate in an amount between about 5.0 to about 15.0 percent, dimethylpolysiloxane in an amount between about 0.50 to about 6.0 percent, a silicone resin solution in an amount between about 0.10 to about 3.0 percent, oleic diethanol amide in an amount between about 0.50 to about 2.0 percent, a second silicate in an amount between about 0.10 to about 3.0 percent, and a bactericide in an amount between about 0.05 to about 0.20 percent, by weight of the total polish composition.

BRIEF DESCRIPTION OF THE PREFERRED EMBODIMENTS

The polish of the present invention is adapted for use on painted metallic and fiberglass surfaces. In particular, it is effective for automobile, trucks and boat bodies. Other applications for the polish are still being developed, but it is anticipated that the polish can be used on many types of painted metallic and fiberglass surfaces in order to improve the surface's color as well as the surface's resistance to ultraviolet rays.

It is known that the polish is effective in removing dirt, dust, grime and oxidation. Further, the polish leaves a film or high gloss polymer film layer on the treated surface. This film layer acts as a barrier to protect the surface from damage, such as discoloration, that normally results from the sun and, in particular, ultraviolet rays.

Significantly, the polish restores the original luster to the dull or faded surfaces by the interaction of the polish with the surface itself. It is believed that the polish removes oxidation on the surface and then adheres to the surface through polar bonding or entrapment due to the color absorbent particles in the polish.

The polish comprises: (1) water, (2) a solvent, (3) a rheological additive, (4) an ultraviolet or UV absorber, (5) a dye, (6) a first silicate, (7) dimethylpolysiloxane, (8) a silicone resin solution, (9) oleic diethanol amide, (10) a second silicate, and (11) a bactericide.

The water is the carrier of the polish composition. It is present in an amount between about 40.0 and about 75.0 percent by weight of the total composition. The water is preferably present in an amount about 66.9 percent by weight of the total preferred polish composition.

The solvent acts to mix ingredients, especially the rheological additive, while in solution. The solvent, preferably, is petroleum naphtha or as it is commonly known mineral spirits. It is a clear, light colored liquid solvent with a hydrocarbon odor. The boiling range of this solvent is about 330 to about 390 degrees Fahrenheit, the vapor pressure is 16 mm Hg, the vapor density is measured at 4.8 with air measured as 1 and the evaporation rate is measured as less than 0.01 with butyl acetate measured as 1.

The solvent is present in an amount between about 12.0 and about 35.0 percent by weight of the total polish composition. In the preferred polish composition, the solvent is petroleum naphtha and is present in an amount about 20.5 percent by weight.

The rheological additive provides the polish composition with the desired elasticity, viscosity and plasticity. The preferred rheological additive is an organophilic clay. The preferred organophilic clay is sold under the mark BENTONE 38 by NL Chemicals/NL Industries, Inc.

The organophilic clay or rheological additive should be present in the total polish composition in an amount between about 0.30 and about 1.0 percent by weight. In the preferred polish composition, it is present in an amount about 0.50 percent by weight of the total preferred polish composition.

The ultraviolet or UV absorber is used to abate the adverse effects of ultraviolet rays on the treated surface. It can be made of any water soluble ultraviolet absorber. The preferred ultraviolet absorber is a 2-propenoic acid-2-cyano-3, 3-diphenyl-2-ethylhexyl ester. It is also known as 2-ethylhexyl 2-cyano-3, 3-diphenyl acrylate. The chemical formula is $C_{24}H_{27}NO_2$. This ultraviolet absorber is sold under the tradename UVINUL N-539 by BASF Corporation.

The ultraviolet absorber is present in an amount between about 0.05 and about 0.50 percent by weight of the total composition. In the preferred composition, it is present in an amount about 0.10 percent by weight.

The dye must be an oil soluble dye in order for the color of the dye to be retained in the present polish composition. It cannot be a water soluble dye. The three dye colors are each used in a different colored embodiment of the polish of the present application. Each colored embodiment can be used in a range of colored surfaces. In particular, a colored embodiment of the present application can be used in about five to about ten different shades. For example, the red colored embodiment can be used in about five to about ten different shades of a red surface.

The three preferred dyes are black, red and blue colorings. The black dye is preferably from the azine dye chemical family and is known as nigrosine base N or solvent black 7. The red dye is preferably from the bisazo dye chemical family and has the formula $C_{25}H_{22}N_4O$. The blue dye is preferably from the anthraquinone dyestuff chemical family and has the chemical formula $C_{30}H_{42}N_2O_2$.

The dye is present in an amount between about 0.0005 and about 3.0 percent by weight of the total polish composition. In the preferred polish composition, it is present in an amount about 0.50 percent by weight.

The first silicate is the unique color absorbent material that is provided to absorb the color of the surface. Basically, the first silicate cleans the oxidized paint from the surface, absorbs the color of the surface and spreads the dye of the polish evenly as it smooths the silicone layers. The first silicate finds its way into the surface. What makes this more unique is that hard particles usually do not absorb colors or other particles.

The first silicate is a magnesium aluminum silicate. It is also known as fullers earth or attapulgite, palygorskite. It has the chemical formula $5(Mg,Al)*8SiO_2*5H_2O*4H_2O$. The preferred magnesium aluminum silicate is sold under the name MIN-U-GEL 400 by Whittaker, Clark & Daniels, Inc.

The magnesium aluminum silicate is present in an amount between about 5.0 and about 15.0 percent by weight of the total polish composition. In the preferred composition, it is present in an amount about 6.0 percent by weight of the preferred polish composition.

The fluid is from the silicone siloxane fluid chemical family. It is used to provide gloss and, also, lubricity thereby providing easy application of the polish composition. The preferred fluid is dimethylpolysiloxane. The silicone siloxane fluid, preferably dimethylpolysiloxane, is present in an amount between about 0.50 and about 6.0 percent by weight of the total polish composition. It is preferred that dimethylpolysiloxane be present in about 2.8 percent by weight in the preferred polish composition.

The silicone resin solution is known as methylsiloxane resin in solvent. It is also known under the trade designation SR107 and is manufactured by General Electric Co. Silicone Products Division. It is used in the polish composition to form a clear, resilient protective film. The silicone resin solution is present in an amount between about 0.10 and about 3.0 percent by weight of the total polish composition. In the preferred composition, it is present in an amount about 1.1 percent by weight of the preferred polish composition.

The oleic diethanol amide is sold under the tradename WITCAMIDE 511 by the Witco Chemical. It is used in the polish composition to emulsify the water and oil solutions of the polish composition. The oleic diethanol amide is present in an amount between about 0.50 and about 2.0 percent by weight of the total polish composition. In the preferred composition, it is present in an amount about 1.0 percent by weight of the preferred polish composition.

The second silicate is used to buff the surface to be treated and, also, to leave a small residue in order to reflect entrapped dye. This material has been found to provide the unique reflective properties of the present polish. These reflective properties are attributed to the second silicate causing the color from the car or treated surface to blend with the selected dye in the present polish.

The second silicate is a potassium aluminum silicate. The preferred potassium aluminum silicate is sold under the name MICA by Whitakker, Clark & Daniels, Inc.

The potassium aluminum silicate or MICA is present in an amount between about 0.10 and about 3.0 percent by weight of the total polish composition. In the preferred composition, it is present in an amount about 0.50 percent by weight of the preferred polish composition.

A bactericide is used in the present polish composition to stabilize the emulsion or composition. It is soluble in or miscible with water and organic solvents. The preferred bactericide is from the substituted meta-dioxane chemical family. It has the chemical name 6-acetoxy-2,4-dimethyl-1,3-dioxane. It has the chemical formula $C_8H_{14}O_4$, and has a molecular weight of 174.2. The bacteriaside is commercially available under the trademark GIV-GARD DXN by Giuvadan Corporation.

The bactericide, preferably the substituted meta-dioxane, is present in an amount between about 0.05 and about 0.20 percent by weight of the total polish composition. It should be present in an amount of about 0.10 percent by weight in the preferred polish composition.

It will be appreciated that the amount of each component will vary as discussed above. The preferred formula is:

| Component | Amount (% weight) |
|---|---|
| Water | 66.9 |
| Petroleum naphtha | 20.5 |
| Organophilic clay | 0.50 |
| Water soluble UV absorber | 0.10 |
| Dye | 0.50 |
| Magnesium aluminum silicate | 6.0 |
| Dimethylpolysiloxane | 2.8 |
| Silicone resin solution | 1.1 |
| Oleic diethanol amide | 1.0 |
| Potassium aluminum silicate | 0.50 |
| 6-acetoxy-2,4-dimethyl-1,3-dioxane | 0.10 |

The preferred ultraviolet absorber is a 2-propenoic acid-2-cyano-3, 3-diphenyl-2-ethylhexyl ester.

The polish should be formulated in the following manner in order to obtain maximum efficacy. Using the preferred polish composition, in a first vessel or container, the solvent, preferably petroleum naphtha in an amount about 20.5 percent by weight is poured in and, then, the organophilic clay in an amount about 0.50 percent by weight is added. The two are agitated for fifteen minutes. The ultraviolet absorber in an amount about 0.10 percent by weight and the dye in an amount about 0.50 percent by weight are then added and the solution is agitated for another fifteen minutes. Next, the magnesium aluminum silicate in an amount about 6.0 percent by weight is added and the solution is then agitated for another fifteen minutes. Lastly, the dimethylpolysiloxane in an amount about 2.8 percent by weight and the oleic diethanol amide in an amount about 1.0 percent by weight are added and the solution is agitated for thirty minutes.

In a second vessel or container, the water in an amount about 66.9 percent by weight, the potassium aluminum silicate in an amount about 0.50 percent by weight and the bactericide, preferably 6-acetoxy-2,4-dimethyl-1,3-dioxane, in an amount about 0.10 percent by weight are poured into the vessel and agitated for fifteen minutes.

The contents of the second vessel are slowly added into the contents of the first vessel while the solution is being agitated. After pouring, the resultant solution is agitated for one hour.

The polish may be applied to the surface by hand using a clean, dry, soft cloth. The hand motion should be a firm circular motion.

An eight ounce bottle of polish will typically cover about two standard size vehicles. The polish, once applied, leaves a film or layer that serves as a sunscreen to block ultraviolet rays.

Having thus described the invention with particular reference to the preferred forms thereof, it will be obvious that various changes and modifications may be made therein without departing from the spirit and scope of the invention as defined by the appended claims.

Wherefore I claim:

1. A polish comprising:
water in an amount between about 40.0 and about 75.0 percent;
a petroleum naphtha in an amount between about 12.0 and about 35.0 percent;
a rheological additive in an amount between about 0.30 and about 1.0 percent;
an ultraviolet absorber in an amount between about 0.05 and about 0.50 percent;
an oil soluble dye in an amount between about 0.0005 and about 3.0 percent;
a first silicate in an amount between about 5.0 and about 15.0 percent;
a fluid from a silicone siloxane fluid chemical family in an amount between about 0.50 and about 6.0 percent;
a methylsiloxane resin in solvent in an amount between about 0.10 and about 3.0 percent;
an oleic diethanol amide in an amount between about 0.50 and about 2.0 percent;
a second silicate in an amount between about 0.10 and about 3.0 percent;
a bactericide in an amount between about 0.05 and about 0.20 percent, by weight of the polish,
wherein the rheological additive is any rheological additive that provides the polish with elasticity, viscosity and plasticity needed for application to painted metallic and fiberglass surfaces.

2. The polish of claim 1, wherein the rheological additive is an organophilic clay.

3. The polish of claim 1, wherein the ultraviolet absorber is a 2-propenoic acid-2-cyano-3, 3-diphenyl-2-ethylhexyl ester.

4. The polish of claim 1, wherein the first silicate is a magnesium aluminum silicate.

5. The polish of claim 1, wherein the silicone siloxane fluid is dimethylpolysiloxane.

6. The polish of claim 1, wherein the second silicate is a potassium aluminum silicate.

7. The polish of claim 6, wherein the magnesium aluminum silicate is present in an amount about 6.0 percent, and wherein the potassium aluminum silicate is present in an amount about 0.50 percent.

8. The polish of claim 1, wherein the bactericide is from a substituted meta-dioxane chemical family.

9. The polish of claim 8, wherein the bactericide is 6-acetoxy-2,4-dimethyl-1,3-dioxane.

10. The polish of claim 1, wherein the petroleum naphtha is present in an amount about 20.5 percent by weight of the polish.

11. A polish comprising:
water in an amount about 66.9 percent;
a petroleum naphtha in an amount about 20.5 percent;
a organophilic clay in an amount about 0.50 percent;
a water soluble ultraviolet absorber in an amount about 0.10 percent;
an oil soluble dye in an amount about 0.50 percent;
a magnesium aluminum silicate in an amount about 6.0 percent;
a dimethylpolysiloxane in an amount about 2.8 percent;
a methylsiloxane resin in solvent in an amount about 1.1 percent;
an oleic diethanol amide in an amount about 1.0 percent;
a potassium aluminum silicate in an amount between about 0.50 percent; and
a bactericide in an amount about 0.10 percent, by weight of the polish.

12. The polish of claim 11, wherein the ultraviolet absorber is 2-propenoic acid-2-cyano-3, 3-diphenyl-2-ethylhexyl ester.

13. The polish of claim 11, wherein the bactericide is 6-acetoxy-2,4-dimethyl-1,3-dioxane.

14. A process for making a polish, the process comprises:
forming a first solution by
(a) blending together a petroleum naphtha and an organophilic clay;
(b) blending an ultraviolet absorber and an oil soluble dye to the blend of the petroleum naphtha and the organophilic clay;
(c) blending a magnesium aluminum silicate into a solution of step (b);
(d) blending a dimethylpolysiloxane and an oleic diethanol amide into a solution of step (c) to form the first solution;
forming a second solution by blending water, a potassium aluminum silicate and a bactericide; and forming the polish by blending the second solution with the first solution.

15. The process of claim 14, further comprising the step of agitating each blend prior to the blending steps (b), (c) and (d) and during the steps of forming of the solution in the second vessel and the forming of the polish.

16. A polish comprising:
water in an amount between about 40.0 and about 75.0 percent;
a petroleum naphtha in an amount between about 12.0 and about 35.0 percent;
a organophilic clay in an amount between about 0.30 and about 1.0 percent;
a water soluble ultraviolet absorber in an amount between about 0.05 and about 0.50 percent;
an oil soluble dye in an amount between about 0.0005 and about 3.0 percent;
a first silicate in an amount between about 5.0 and about 15.0 percent;
a fluid from a silicone siloxane fluid chemical family in an amount between about 0.50 and about 6.0 percent;
a methylsiloxane resin in solvent in an amount between about 0.10 and about 3.0 percent;
an oleic diethanol amide in an amount between about 0.50 and about 2.0 percent;
a second silicate in an amount between about 0.10 and about 3.0 percent; and
a bactericide in an amount between about 0.05 and about 0.20 percent, by weight of the polish.

* * * * *